United States Patent [19]
Erickson

[11] Patent Number: 5,902,114
[45] Date of Patent: May 11, 1999

[54] METHOD OF TEACHING THE FORMULATION OF MATHEMATICAL WORD PROBLEMS

[76] Inventor: Ranel Einar Erickson, 1028 San Gabriel St., Henderson, Nev. 89015

[21] Appl. No.: 08/909,855

[22] Filed: Aug. 12, 1997

[51] Int. Cl.$^6$ .............................. G09B 19/02; G09B 5/00
[52] U.S. Cl. ............................................ 434/188; 434/201
[58] Field of Search .................................. 434/188, 191, 434/201, 211

[56] References Cited

U.S. PATENT DOCUMENTS

| | | | |
|---|---|---|---|
| 5,135,398 | 8/1992 | Thornton et al. | 434/201 |
| 5,428,712 | 6/1995 | Elad . | |
| 5,441,278 | 8/1995 | Nalder . | |
| 5,581,663 | 12/1996 | Zlotin . | |
| 5,584,699 | 12/1996 | Silver | 434/201 |
| 5,596,698 | 1/1997 | Morgan | 345/339 |

OTHER PUBLICATIONS

John Saxon, Algebra II An Incremental Development, 1985 pp. 142–145, Grassdale Publishers, Inc. Norman, Oklahoma.

Kaj L. Nielsen, College Mathematics, 1958, pp. 243–245 Barnes and Noble, Inc. New York, NY.

David Halliday, Robert Resnick, Fundamentals of Physics, 1974, pp. 48–51.

*Primary Examiner*—Robert A. Hafer
*Assistant Examiner*—John Edmund Rovnak

[57] ABSTRACT

A system and method of teaching the formulation of word problems is provided. The method provides for a series of steps that systematically build components related to each other through dimensional analysis. When this method is implemented using computer software, the identification and relationships of the components are revealed through hypertext links and associated schematic diagrams. Additional tools needed to formulate the problem are accessible to the student through a database of mathematical tools, including formulas, rules, theorems, and suggested mathematical phrases that represent typical word phrases.

5 Claims, 6 Drawing Sheets

A family is planning a vacation to a destination 140 miles further than last years vacation. They traveled an average of 70 miles per hour while on vacation and it took 4 hours to reach their destination last year. The children want to know how many minutes it will take to reach their destination this year.

FIG. 1

| STEP | DERIVATION | EXPRESSION | DIMENSION | DESCRIPTION |
|---|---|---|---|---|
| 1 | PRIMARY CONSTANT | 140 | MILES | DIFFERENCE BETWEEN DISTANCE TRAVELED THIS YEAR AND LAST YEAR. |
| 2 | PRIMARY CONSTANT | 70 | MILES/ HOUR | AVERAGE SPEED USED LAST YEAR AND THIS YEAR |
| 3 | PRIMARY CONSTANT | 4 | HOURS | TIME TO REACH DESTINATION LAST YEAR |
| 4 | PRIMARY VARIABLE | X | MINUTES | TIME TO REACH DESTINATION THIS YEAR |
| 5 | CONVERSION CONSTANT | 60 | MINUTES/ HOUR | CONVERSION BETWEEN SIMILAR UNITS USED IN THE PROBLEM |
| 6 | PRIMARY VARIABLE | D1 | MILES | DISTANCE TRAVELED LAST YEAR (SEE SCHEMATIC DIAGRAM #1) |
| 7 | PRIMARY VARIABLE | D2 | MILES | DISTANCE TRAVELED THIS YEAR (SEE SCHEMATIC DIAGRAM #1) |
| 8 | 1,6,7 | D2 = D1 + 140 | MILES | FUNCTIONAL RELATIONSHIP FROM SCHEMATIC DIAGRAM # 1 |
| 9 | 2,4,6 | D1 =(70) · (4) = 280 | MILES = (MILES/ HOUR) · (HOUR) | RELATIONSHIP OF DISTANCE AND TIME TRAVELED LAST YEAR |
| 10 | 8,9 | D2 = 280 + 140 = 420 | MILES | RELATIONSHIP OF DISTANCES WITH SUBSTITUTIONS OF OTHER COMPONENTS |
| 11 | 2,4,5 | (70/60)X | MILES (SEE * BELOW) | MILES TRAVELED THIS YEAR FROM THE PERSPECTIVE OF THIS YEARS TIME |
| 12 | 10,11 | (70/60)X = 420 | MILES | THE MILES IN COMPONENT 10 AND 11 ARE EQUAL. THIS EQUATION WILL ALLOW US TO SOLVE FOR X |

- (70 MILES/HOUR)( 1 HOUR/ 60 MINUTES)(X MINUTES) = MILES

FIG. 3

METHOD OF TEACHING THE FORMULATION OF MATHEMATICAL WORD PROBLEMS

BACKGROUND OF THE INVENTION

1. The Field of the Invention

The present invention relates to systems, methods and training aids for teaching the formulation of mathematical word problems, and more particularly relates to a method of sequentially constructing and displaying the mathematical components associated with a word problem.

2. The Prior State of the Art

The classic research of the famous mathematician George Polya (from Stanford University) characterizes the problem solving techniques used in current education literature. The strategies (or heuristics) identified by Polya include:

considering similar problems, introducing symbols or representations, drawing pictures and diagrams, work backwards from the desired results, reducing the gap between what is known and that which is not known, and breaking up complex problems into simpler ones.

These strategies are purposefully general to characterize various types of problems. The current state of the art is to apply these various strategies also to a subset of problems, called word problems. The traditional use of a word problem is to illustrate the abstract mathematical principles covered in the current material being studied, say, in the previous section or chapter. Students focus their attention on the abstract concepts and associate those concepts with the related words in the given problem. Very seldom does a student develop a structured approach to word problems in general, and unfortunately, most students develop a fear of word problems over the course of their education.

Various studies indicate successful problem solving depends not only on having various strategies at our disposal, but on the knowledge base of specific mathematical tools. Such tools are acquired gradually as the student develops a complex network of mathematical ideas and processes, in some sense, a tool box. The acquisition of these tools and the ability to formulate problems should be nurtured together. The importance of formulating word problems is emphasized by the fact that The National Council of Teachers of Mathematics has cited problem solving as one of their major goals over the last couple of decades.

Dimensional analysis is a technique used primarily in the physical sciences to verify proper construction of quantitative expressions. The technique is based on the cancellation of common units in the denominator and numerator when multiplying components and through the restriction of adding and comparing only those components with similar dimensions. For example the gravitational constant g has the dimension of meters/sec$^2$. So to find the velocity of a falling object after 10 seconds, one can express it as $$(10 \text{ sec})(g \text{ meters/sec}^2) = 10 \text{ g meters/sec}$$

Notice, in particular, the sec in the numerator of the dimension of 10 canceled with one of the sec units in the denominator of dimension of g. The resulting dimension indeed reflects the nature of velocity.

Some authors have used the concept of dimensional analysis to help students understand "ratio problems". In U.S. Pat. No. 5,441,278 (Apparatus and Method of Playing an Educational Card Game), the inventor accurately stated that very few schools teach this technique. Existing products currently on the market (such as Mathcad from Mathsoft) emphasize the solutions, graphs, and computational aspects of mathematics. They use dimensional analysis only to verify mathematical expressions. Dimensional analysis has not been taught widely, because it is not been applied to the extent that this invention introduces.

As typified by the success of the World Wide Web (Web), hypertext has played a significant role in organizing information and creating an educational environment. In fact, the primary protocol on the Web is HTML, which stands for HyperText Markup Language. Due to the lack of a structured approach to formulating word problems, the use of hypertext techniques has not been applied systematically to the formulation of word problems.

In summary, there does not exist a comprehensive method used as the fundamental basis for identifying and constructing the various components of word problems. Therefore current educational institutions do not teach a single systematic framework to formulate such problems, and most students are frustrated with their ability to understand and formulate word problems. Dimensional analysis is used only in a limited way and a centralized accessible depository of mathematical facts for the student to effectively draw from when formulating word problems has not materialized. Finally, without a structured methodology, there is no training tools for the systematic formulation of word problems based on hypertext technologies.

SUMMARY AND OBJECTS OF THE INVENTION

The foregoing problems in the prior art state have been successfully overcome by the present invention, which is directed to systems, methods, and training aids for teaching the formulation of mathematical word problems. The systems, methods, and training aids depend on dimensional analysis as the fundamental basis for identifying and constructing the increasingly complex components of the word problem. This provides a structured framework to coordinate the use of schematic diagrams, formulas, axioms, rules, theorems, and other math facts. It encourages the instructors and students to focus on the essence of applied mathematics, namely to quantify the world around us. The invention clearly defines a method to bridge the gap between the abstract mathematical components and the actual objects described in the word problem.

The following definitions provide a foundation for the method described below.

A 'unit' is a single measurement or quantifiable entity, for example, ft, gallons, lbs, dollars ($), miles, etc.

A 'dimension' is a single unit or any combination (multiplied or divided) of units, for example, miles/hr, lbs/inch$^2$, $/package, miles/gallon etc. (In the literature, units and dimensions are often used interchangeably.)

A 'primary component' is a single value or a single symbol representing a constant or a variable (unknown), for example, 15 miles/gallon, G gallons, etc.

A 'component' is a primary component or any combination (using mathematical operators) of primary components, for example, 15 G miles (which is the number of miles that can be traveled with G gallons.

'Dimensional analysis' (i.e., 'units analysis') is the technique of verifying proper combining and relating of components through the cancellation of common units in the denominator and numerator when multiplying components and through the restriction of adding or comparing only those components with similar dimensions.

A 'schematic diagram' is a drawing that illustrates the relationship between a specific group of components. For example, the above components concerning gallons per mile could be illustrated on a map by placing hash marks every fifteen miles and numbering them in sequence.

A 'conversion component' is a known relationship between two or more units. For example: 5280 ft/mile, 16 oz/lb, etc.

A 'formula' is a known mathematical relationship between two or more entities. For example, the length C of the hypotenuse of a right triangle satisfies the formula $C^2=A^2+B^2$ where A and B are the lengths of the other sides.

The 'tool box' is a collection of mathematical facts that the student has available to them to construct the components. Such facts include conversion components, formulas, axioms, theorems, rules, and hints on how certain words are translated into mathematical statements.

A 'functional relationship' is a mathematical expression that determines the relationship of one component to other components. Examples include equations, inequalities, probability distributions, etc.

The systems and methods of the present invention comprise a sequence of steps that are demonstrated to the student by the text, instructor, or the hypertext-based computer software. At each step, one of the following four component construction processes is used:

Identify a primary component in the word problem with its corresponding dimension and description.

Identify a conversion component whose dimension contains a unit contained in the dimension of a previously defined component.

Identify a (compound) component that can be constructed from previously defined components using mathematical operators.

Identify a functional relationship between the components defined above using schematic diagrams and tools from the tool box.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 is a sample word problem to be used to illustrate the method.

FIG. 3 is a sample sequence of steps identifying the components created to formulate the sample word problem.

DETAILED DESCRIPTIONS OF THE PREFERRED EMBODIMENTS

The following invention is described by using a specific example of a word problem to illustrate either the structure or the processing of certain embodiments of the method and of systems that implement the method of the present invention. Using the diagrams in this manner to present the invention should not be construed as limiting of its scope. The present invention contemplates methods for formulating word problems and systems of presenting these methods. Embodiments of systems of the present invention may comprise a general purpose computer. Such a general purpose computer may have any number of basic configurations. For example, such a general purpose computer may comprise any or all of a central processing unit (CPU), one or more specialized processors, system memory, mass storage such as a magnetic disk, an optical disk, or other storage device, an input means such as a keyboard and/or mouse, a display device, and printer or other output device. A system implementing the methods of the present invention can also comprise a special purpose computer or other hardware systems and all should be included within its scope.

Embodiments within the scope of the present invention also include computer readable media having executable instructions. Such computer readable media can be any available media which can be accessed by a general purpose or special purpose computer via the Internet, networks, and attached computer readable media. By way of example, and not limitation, such computer readable media can comprise RAM, ROM, EPROM, CD ROM and other optical disk storage, magnetic storage devices, or any other medium which can be use to store the desired executable instructions. Combinations of the above should also be included within the scope of computer readable media.

Figure 2:
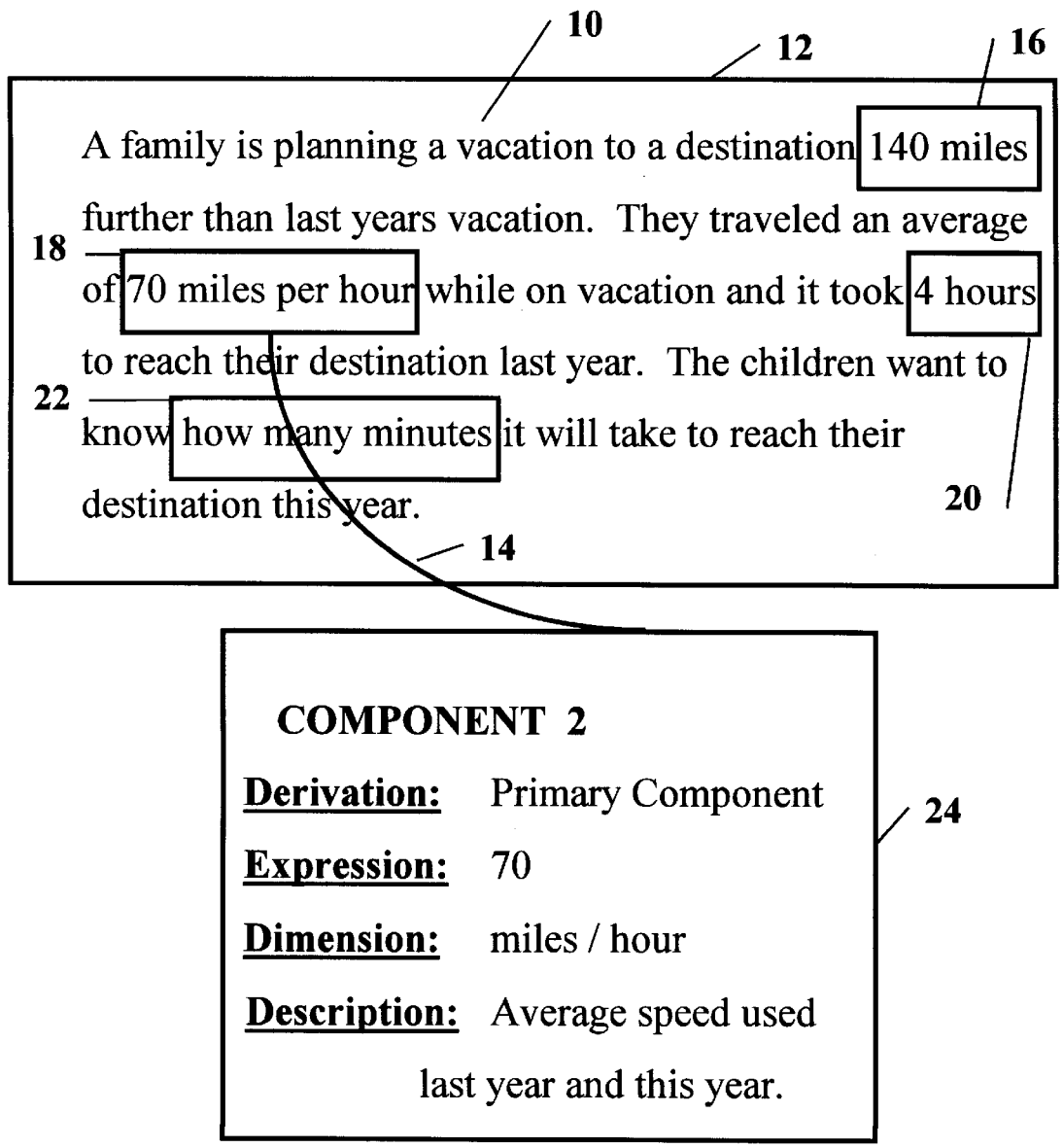
FIG. 2 is the sample word problem with the primary components highlighted, and an example of a hypertext link to the description of the second component is shown.

The method of the present invention comprises a sequence of steps that is demonstrated to the student by the text, instructor, or computer readable media. In the preferred embodiment, computer readable media comprises hypertext computer software that displays a word problem 10 on a computer screen 12 in FIG. 1. The software allows the user to explore hypertext links that suggest the various components that can be identified and constructed. In FIG. 2, primary components are highlighted by rectangles 16, 18, 20, and 22. On selecting, say the second component (highlighted by rectangle 18), a hypertext link 14 displays a window 24 that describes the derivation, expression, dimension, and descriptions of that component.

On demand, the student can observe a suggested sequence of steps of constructing components as listed in FIG. 3. At each step as designated in column 26, one of the following four component construction processes is used:

Identify a primary component in the word problem with its corresponding derivation, expression, dimension and description as shown in columns 28, 30, 32, and 34 respectively in FIG. 3. In the preferred embodiment, (as discussed previously) the student can select (say by clicking the mouse over) rectangle 18 in FIG. 2 to view information in window 24 concerning that primary component.

Figure 4:
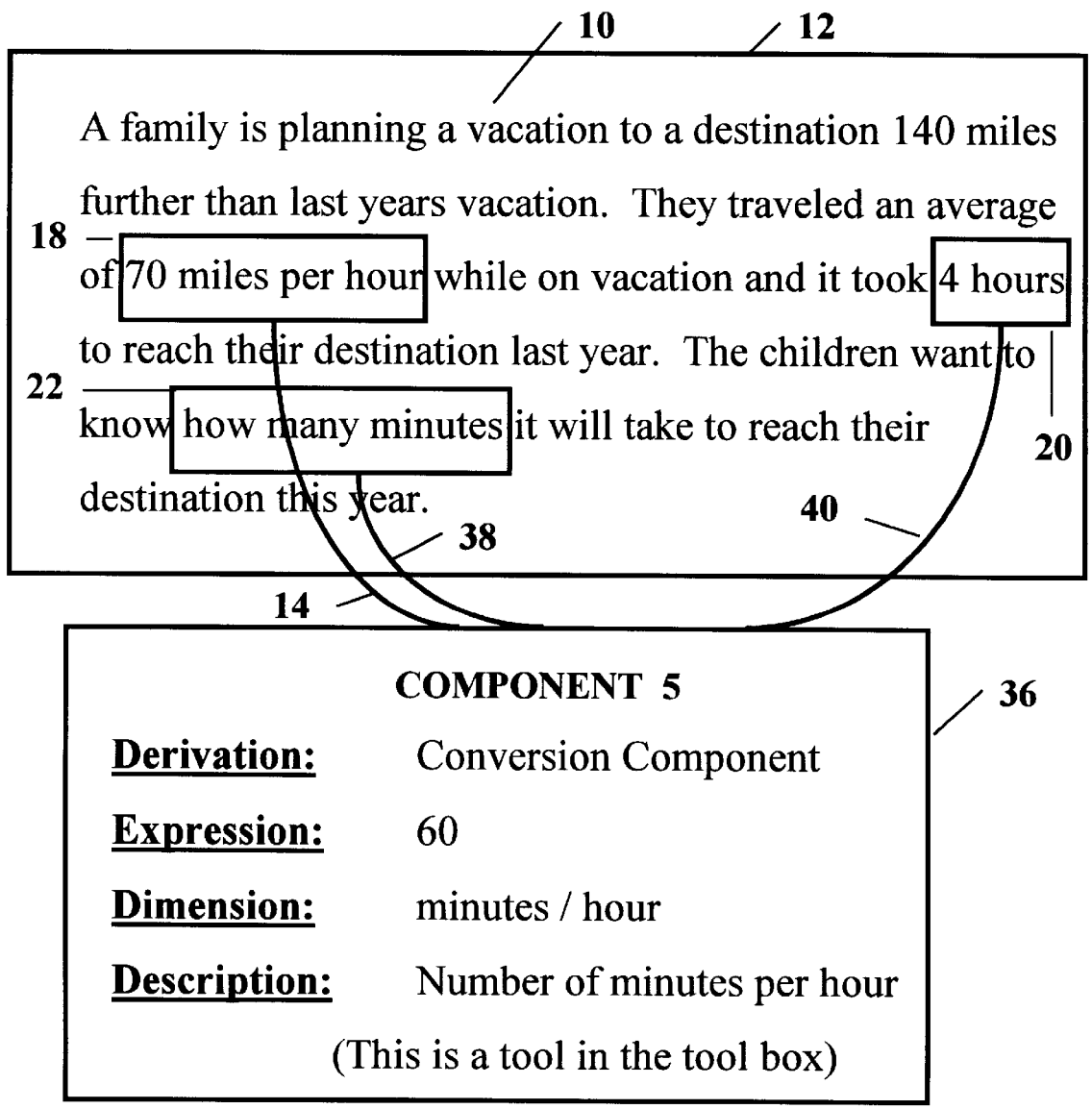
FIG. 4 is the sample word problem with a hypertext link from the hour and minute components to a conversion component that converts from hours to minutes.

Identify a conversion component whose dimension contains a unit contained in the dimension of a previously defined component. In FIG. 4, the display of a conversion component in a window 36 is linked by hypertext links 14, 38, and 40 to the components highlighted by rectangles 18, 20, and 22, respectively. These components have similar units in their dimensions, namely minutes and hours.

Figure 5:
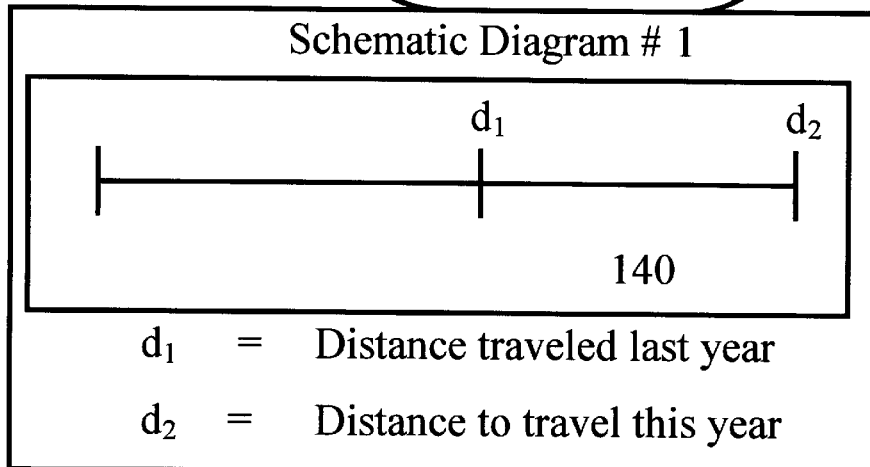
FIG. 5 is the sample word problem with a hypertext link to a schematic diagram and a formula describing distances traveled. This formula uses tools (i.e., mathematical facts), such as distances are additive, and the word 'further' is translated to addition.

Identify a (compound) component that can be constructed from previously defined components. The construction process uses dimensional analysis, schematic diagrams, and tools from the mathematical tool box. This is a significant advantage over other educational methods since it provides the student with a systematic way of immediately accessing the resources needed to understand and construct word problems. In FIG. 5, rectangles 16 and 38 have hypertext links 42 and 44, respectively, to the schematic diagram shown in window 46. This window also contains an example of a tool 48 derived from an external database 50 which contains mathematical formulation facts such as distances are additive and the word "further" indicates addition.

Figure 6:
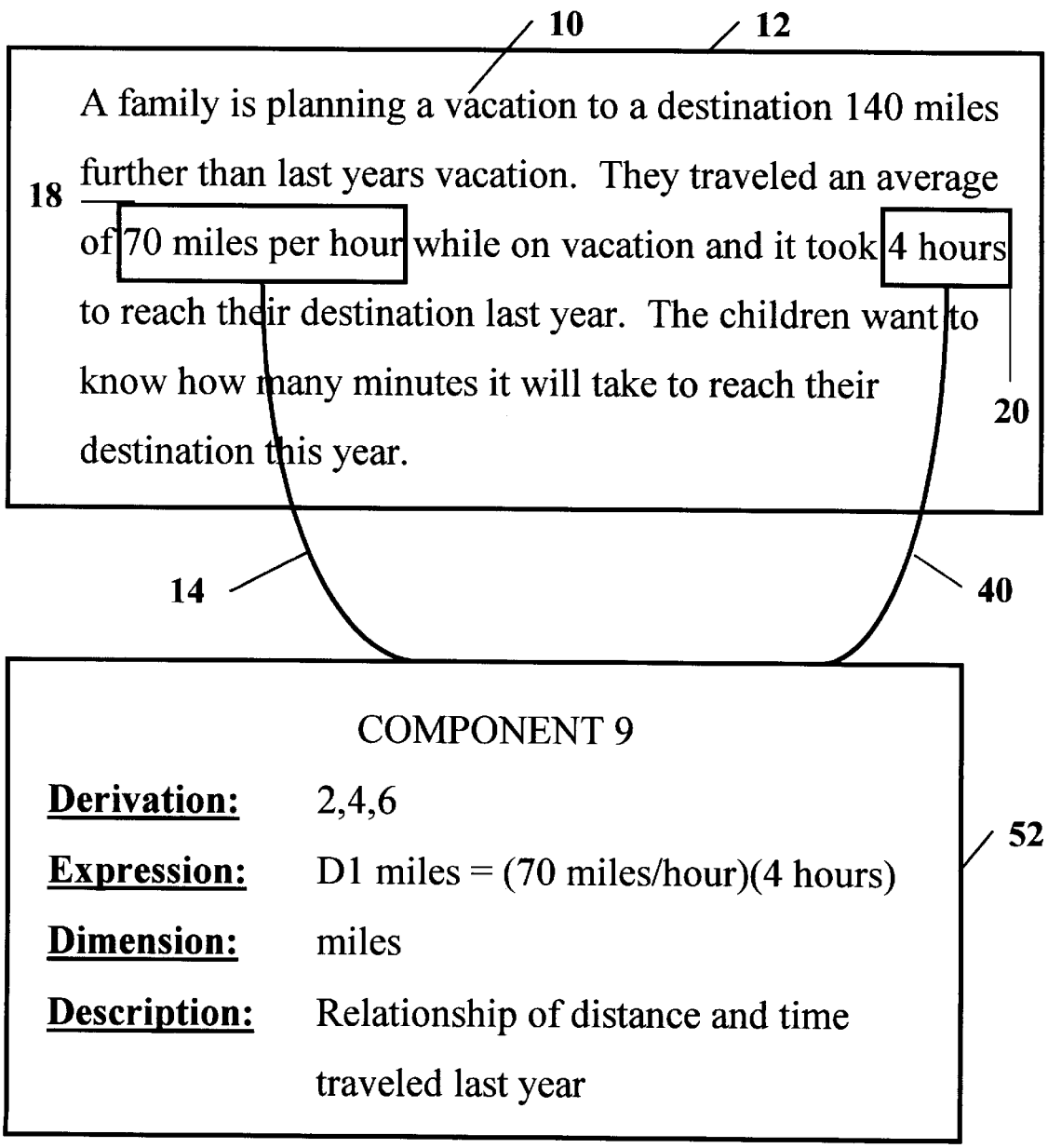
FIG. 6 is the sample word problem with a hypertext link to a functional relationship derived from previous components.

Identify a functional relationship between the components defined above using schematic diagrams and tools from the tool box. In the preferred embodiment, these diagrams and tools are displayed on demand through links in the hypertext software. In FIG. 6, the primary component ("70 miles per hour") highlighted by rectangle 18 has a unit of "hour" in the denominator. The primary component ("4 hours") highlighted by rectangle 20 has a unit of hours in the numerator. When multiplied together, the resulting component has a dimension of miles and through hypertext links 14 and 40 is displayed in a window 52.

The component construction steps end when there exists sufficient components to completely characterize or solve for the variables.

In FIG. 3, the components are listed in the order in which they appear in the word problem, and in the order in which they are constructed. The detail is important for the novice student to develop patterns of reasoning and constructing of components. As their skills develop they can combine certain steps, for example, a skilled problem solver could skip over steps 6, 7, and 8 and use only steps 9 and 10 to identify distances. There are multiple sequences of components that will lead to the end result. For example instead of components 10 and 11, a student may consider constructing the following component whose base unit is minutes instead of miles:

X minutes=(420 miles) (1 hour /70 miles) (60 minutes /1 hour).

In any case, the structured method of this invention helps the student stay on a course leading to correct answers and helps them to overcome the fear of word problems.

One application of this invention involves a publisher who provides a central depository of sample word problems and math facts accessed via the Internet (or distributed on CD-ROMs). This set of word problems then would be accessible from the supplementary computer software associated with each of their published text books relating specific topic to selected sets of word problems. Again this text-specific software can be distributed over the Internet or by CD-ROM. Applicable text books would range over various disciplines including algebra, physics, chemistry, finite mathematics for business and social sciences, etc.

Another application of this invention is a game or motivational system for children to learn mathematical facts. It comprises a set of cards with printed word problems. Associated with each word problem card are a series of hint cards, progressively showing the construction of the components using dimensions of previous components. A point system encourages the student to solve the problem by using as few of the hint cards as possible. Each child receives a physical tool box and is encouraged to collect cards on which are described specific math facts. When the child demonstrates their knowledge of that tool (for example, through solving associated word problems) they may put the tool in their tool box. The hint cards refer to the appropriate tool cards.

What is claimed is:

1. A method of teaching the formulation of mathematical word problems comprising the steps of:

displaying on a computer screen a given word problem;

highlighting on demand the primary components of the word problem;

providing hypertext links that display information on a computer screen concerning the components of the word problem;

indicating the dimensions of these components; and defining and displaying additional components derived from previously defined components using dimensional analysis.

2. A method of teaching the formulation of mathematical word problems as recited in claim 1 further comprising the step of selecting from a database of conversion components those conversion components related to components of the word problem.

3. A method of teaching the formulation of mathematical word problems as recited in claim 2 further comprising the step of accessing a database of mathematical tools such as formulas, rules, and theorems for the purpose of constructing components.

4. A method of teaching the formulation of mathematical word problems as recited in claim 3 further comprising the step of accessing a database containing hints on how certain words are translated into mathematical statements.

5. A method of teaching the formulation of mathematical word problems as recited in claim 4 further comprising the step of demonstrating on the computer screen schematic diagrams that relate the components together.

* * * * *